Patented Feb. 18, 1936

2,030,859

UNITED STATES PATENT OFFICE 2,030,859

TEXTILE ASSISTANTS

Othmar Drapal, Cologne-Mulheim, Germany, assignor to General Aniline Works, Inc., New York, N. Y., a corporation of Delaware No Drawing. Application August 31, 1934, Serial No. 742,349. In Germany September 12, 1933

6 Claims. (Cl. 252—1)

The present invention relates to improved compositions consisting of or containing Turkey red oil.

I have found that the valuable properties of Turkey red oil can be considerably improved by incorporating with the same spent sulphite liquor and an alkali metal phosphate.

I am aware of the fact that Turkey red oil owing to its dispersing, dissolving and wetting capacities represents a valuable auxiliary agent for dyeing purposes. Customary Turkey red oil, however, exhibits the disadvantage of being precipitated by calcium compounds, whereby the application of Turkey red oil in hard water is impaired. In order to overcome this disadvantage, attempts have been made to employ higher sulphonated materials; however, no clear success has been reached up to the present time.

I have now found that the lack of resisting capacity towards calcium compounds of the customary Turkey red oils can be overcome by incorporating therewith or with mixtures containing the same spent sulphite liquor in combination with an alkali metal phosphate.

The proportion of the sulphite liquor to be added can be varied within relatively wide limits, and may even surpass 30% by weight, the sulphite liquor used for the present purpose being the customary sulphite liquor spent generally obtained by thickening the crude spent liquor and, if desired, neutralizing and purifying the same.

In general the proportion of the alkali metal phosphate to be added amounts to about 3% by weight of the mixture of Turkey red oil and sulphite liquor.

The mixtures obtained in the manner described can be used instead of Turkey red oil for many purposes in the textile industry. For producing desired effects water-soluble or insoluble dissolving and/or wetting agents may be incorporated with the mixtures. The mixtures according to the present invention have proved to be particularly suited for dyeing with ice dyes, whereby the mixtures may at the same time contain the grounding components such as o-hydroxynaphthoic acid arylides or arylides of other aromatic o-hydroxycarboxylic acids.

The following example illustrates the invention, without limiting it thereto the parts being by weight:—

For the manufacture of a preparation of grounding baths for dyeing with ice dyes, 300 parts by weight of a Turkey red oil (50%),
100 parts by weight of glycol monobutyl ether,
6 parts by weight of caustic soda lye,
300 parts by weight of sulphite liquor,
20 parts by weight of trisodium orthophosphate,
60 parts by weight of the sodium salt of butyl naphthalene sulphonic acid.

are mixed, whereupon 214 parts of water are added.

For the hot dissolving process 10 parts by weight of a $\beta$-hydroxynaphthoic acid arylide,
15-30 parts by weight of the oily mixture obtained according to the first paragraph of this example,
15-30 parts by weight of caustic soda lye of 38° Bé.

are pasted, whereupon the whole is dissolved by means of hot water and, if desired, by boiling the mixture. It is to be understood that instead of trisodium orthophosphate there may be used with the same advantage disodium orthophosphate, monosodium orthophosphate or the corresponding potassium compounds.

I claim:—

1. The composition of matter comprising Turkey red oil, spent sulphite liquor, an alkali metal phosphate, an alkali metal salt of an alkylated naphthalene sulphonic acid, and a dissolving medium.

2. The composition of matter comprising Turkey red oil, spent sulphite liquor, an alkali metal phosphate in an amount of about 3% calculated upon the amount of the mixture of Turkey red oil and sulphite liquor, an alkali metal salt of an alkylated naphthalene sulphonic acid, and a dissolving medium.

3. The composition of matter as claimed in claim 1 in which trisodium orthophosphate is employed as alkali metal phosphate.

4. The composition of matter as claimed in claim 2 in which trisodium orthophosphate is employed as alkali metal phosphate.

5. The composition of matter as claimed in claim 1 in which glycol monobutyl ether is employed as the dissolving medium.

6. The composition of matter comprising Turkey red oil, spent sulphite liquor, trisodium orthophosphate, the sodium salt of butyl naphthalene sulphonic acid, and glycol monobutyl ether.

OTHMAR DRAPAL.